United States Patent [19]

Kim

[11] Patent Number: 5,963,519
[45] Date of Patent: Oct. 5, 1999

[54] INFORMATION RECORDING METHOD AND APPARATUS

[75] Inventor: Dae Young Kim, Seoul, Rep. of Korea

[73] Assignee: LG Electronics Inc., Seoul, Rep. of Korea

[21] Appl. No.: 08/890,553

[22] Filed: Jul. 9, 1997

[30] Foreign Application Priority Data

Jul. 13, 1996 [KR] Rep. of Korea ....................... 96-28322
Apr. 4, 1997 [KR] Rep. of Korea ....................... 97-12570

[51] Int. Cl.$^6$ ....................................................... G11B 7/00
[52] U.S. Cl. ................................ 369/50; 369/58; 369/47
[58] Field of Search .................................. 369/47, 48, 49, 369/50, 54, 58, 59, 60, 32, 124; 360/48, 53, 51

[56] References Cited

U.S. PATENT DOCUMENTS

5,712,836  1/1998  Kamoto et al. ........................... 369/50
5,729,513  3/1998  Akahira et al. ....................... 369/50 X
5,757,750  5/1998  Uemura ..................................... 369/50

*Primary Examiner*—Muhammad Edun

[57] ABSTRACT

An information recording method which comprises the steps of detecting a predetermined clock signal based on the support information, the support information including a synchronous signal and first address information, the synchronous signal dividing a track on the recording medium into a plurality of predetermined first unit regions, the first address information indicating the first unit regions; counting pulses of the detected predetermined clock signal to generate new address information for dividing the track into second unit regions; and recording user information on the recording medium according to the second unit regions.

20 Claims, 10 Drawing Sheets

INFORMATION RECORDING METHOD AND APPARATUS

BACKGROUND OF THE INVENTION

1. Field of the Invention

This invention relates to a technique of recording information onto a recording medium, and more particularly to an information recording method and apparatus wherein information is recorded onto the record medium on which support information such as position information, etc. has been preformatted.

2. Description of Prior Art

Generally, in order to record and reproduce information on/from the recording medium, a recording/reproducing apparatus must accurately recognize a positions on the recording medium to be accessed. For this purpose, address information and other information, referred to as support information hereinafter, which indicate a specified position of the disc, need to have been recorded on the recording medium in advance, that is, preformatted of certain information is needed. Usually, such support information allows the user information to be recorded in a certain unit, and also allows the identification information such as an address per record unit, etc., to be provided by the recording apparatus.

Figure 1:
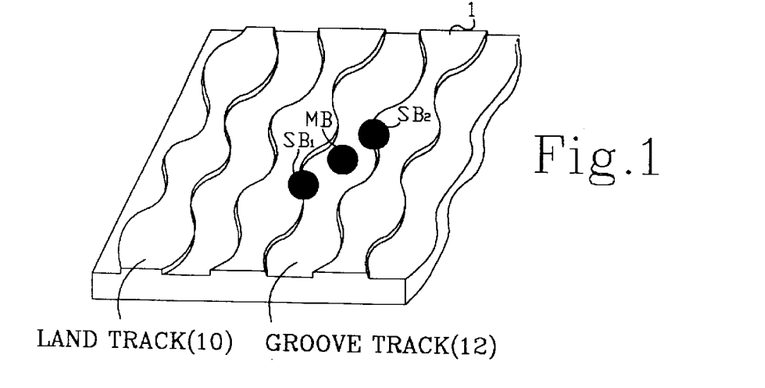
FIG. 1 is a schematic view of an optical disc on which support information is preformatted by a wobbling method.

An example of the recording medium on which the support information has been preformatted will be described with reference to FIG. 1 to FIG. 4. FIG. 1 represents a disc type of the compact disc-write once (CD-WO) in a so-called wobbling method. As shown in FIG. 1, grooves wobbled from the center of the disc 1 until the circumference of the disc 1, referred to as "groove tracks" 12 hereinafter, are repeated in a certain period, and also flat portions, referred to as "land tracks" 10 hereinafter, are arranged in parallel with the groove tracks between the grooves. The above-mentioned support information is preformatted on portions wobbled in each side of the groove tracks, referred to as "wobbled pits" below.

Figure 2:
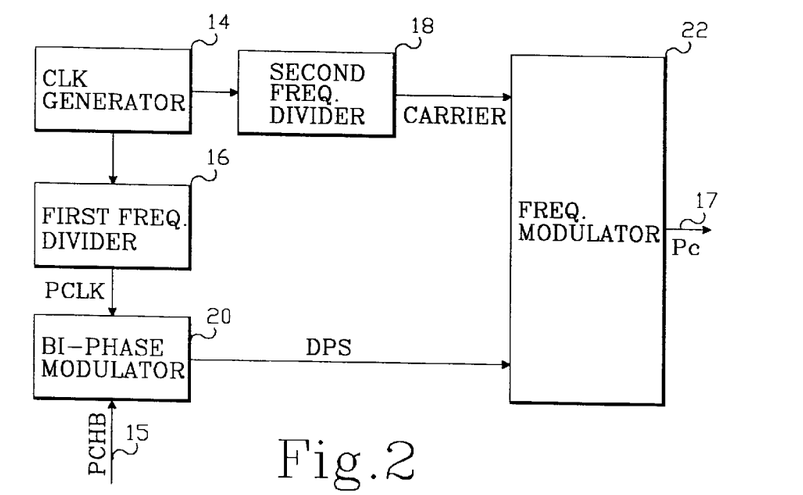
FIG. 2 is a block diagram showing the configuration of a support information preformatting apparatus for preformatting the support information on the recording medium.

Such support information of the wobbling method can be preformatted on an optical disc by a preformatting apparatus as shown in FIG. 2. In FIG. 2, the support information preformatting apparatus includes the first and the second frequency dividers 16 and 18 to which a clock signal of 44.1 Khz from a clock generator 14 is inputted, a frequency modulator 22 to which a carrier signal from the second frequency divider 18 is inputted, and a dual-phase (or biphase) modulator 20 to which the channel bit stream PCHB is inputted via an input line 15. The first frequency divider 16 makes a frequency division of the clock signal of 44.1 Khz from the clock generator 14 by seven to generate a dual-phase clock signal PCLK of 6.3 Khz. The second frequency divider 18 makes a frequency division of the clock signal of 44.1 Khz from the clock generator 14 by two to generate the carrier signal of 22.05 Khz. The dual-phase modulator 20 make a dual-phase modulation of the channel bit stream PCHB from the input line 15 to generate a dual-phase signal DPS. This dual-phase signal DPS is outputted via an output line 17 after it is frequency-modulated by the frequency modulator 22 in which the carrier signal is utilized for the frequency modulation. Further, the channel bit stream PCHB is generated by the channel-coding the support information consisting of synchronous signal portions and identification code portions. These identification code portions generally include address information indicating the physical position of the optical disc and other information concerning the disc. Hereinafter, explanations will be provided assuming that only the address information exists in the identification code. Moreover, the support signal may further comprise an error correction code for correcting errors at the time of reproducing the identification code, for example, "Cyclic Redundancy Check" (CRC) code.

Figure 3:
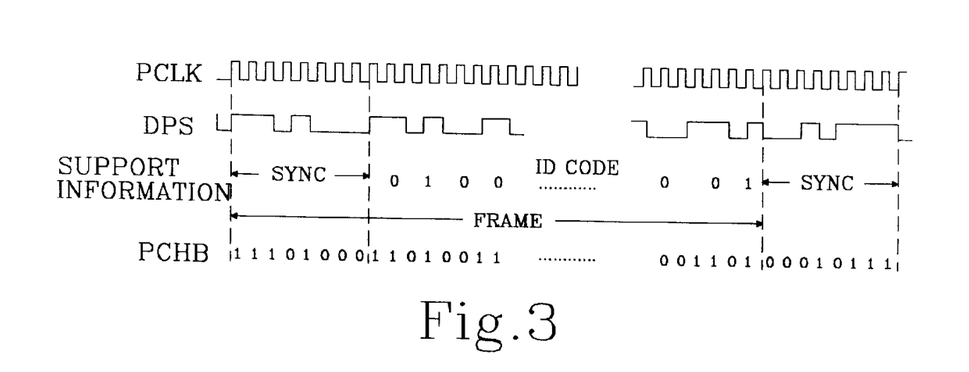
FIG. 3 is a waveform diagram showing the operation of each parts shown in FIG. 2.

Therefore, as shown in FIG. 3, a unit sectioned by the synchronous signal SYNC and the ID code, referred to as "frame" below, defines a unit of user information to be recorded. By this frame, the physical length of the user information unit is defined. In other words, the user information unit is matched by 1 to 1 with the frame such that it is recorded on the recording medium with a constant physical length. The address information of each frame represents the physical position of the corresponding frame.

An example of exploiting such support information in the wobbling method at the time of recording the user information will be described with reference to FIG. 4 to FIG. 7 below.

Figure 4:
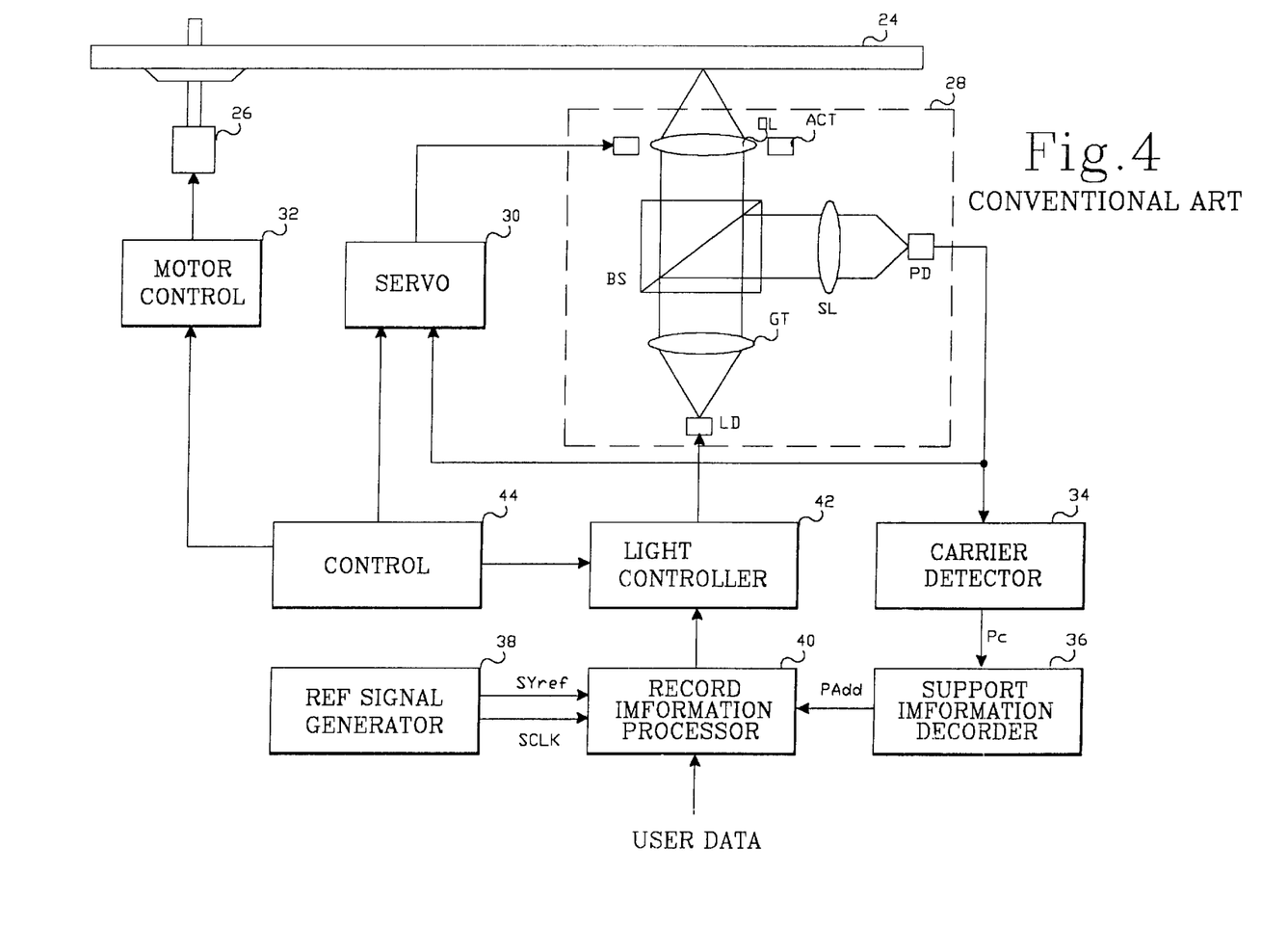
FIG. 4 is a block diagram showing the configuration of a conventional optical disc recording apparatus.

Referring to FIG. 4, a conventional optical disc recording apparatus comprises a spindle motor 26 for rotating an optical disc 24, a servo portion 30 connected to an optical pickup 28, and a motor driver 32 connected to the spindle motor 26. The optical pickup 28 irradiates a single main light beam MB and two support light beams SB$_1$ and SB$_2$ onto the groove track 12 of the optical disc 24 as shown in FIG. 1, to thereby record information by the main light beam MB and read out the preformatted support signal information by the support light beams SB$_1$ and SB$_2$. The optical pickup 28 comprises a photo detector PD for detecting three light beams MB, SB$_1$ and SB$_2$ reflected from the optical disc 24, a beam splitter BS, a laser diode LD, an actuator ACT, lenses OL and SL, and a diffraction grid GT. The servo portion 30 drives the actuator ACT in the optical pickup 28 by means of an output signal from the photo detector PD, thereby performing a focusing servo function, a tracking servo function and the like. On the other hand, the motor driver 32 controls a rotation speed of the spindle motor 26 in response to a signal from the control portion 44.

Figure 5:
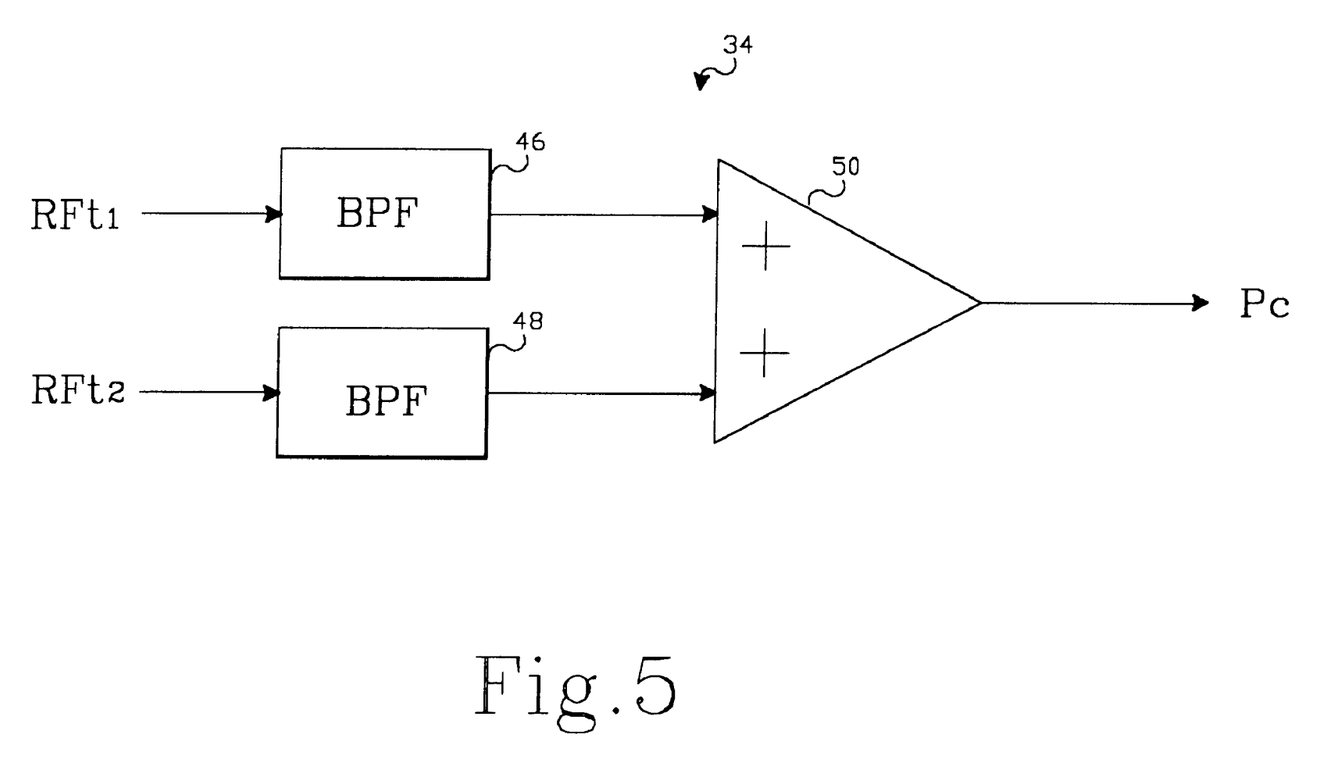
FIG. 5 is a detailed block diagram of a carrier signal detector shown in FIG. 4.

Further, the conventional optical disc recording apparatus includes a carrier signal detector 34 connected to the photo detector PD in the optical pickup 28, and a support information decoder 36 connected to the carrier signal detector 34. The carrier signal detector 34 detects a carrier signal Pc preformatted on the groove track 12 of the optical disc 24 from an output signal of the photo detector PD. The carrier signal detector 34 consists of a first band pass filter 46 for band-filtering the first high frequency signal RFt1, a second band pass filter 48 for band-filtering the second high frequency signal RFt2, and an adder/amplifier 50 for adding an output signal of the first band pass filter 46 to an output signal of the second band pass filter 48, as shown in FIG. 5. This adder/amplifier 50 adds and amplifies the output signals of the first and second band pass filters 46 and 48 to detect a certain period of the carrier signal Pc.

Figure 6:
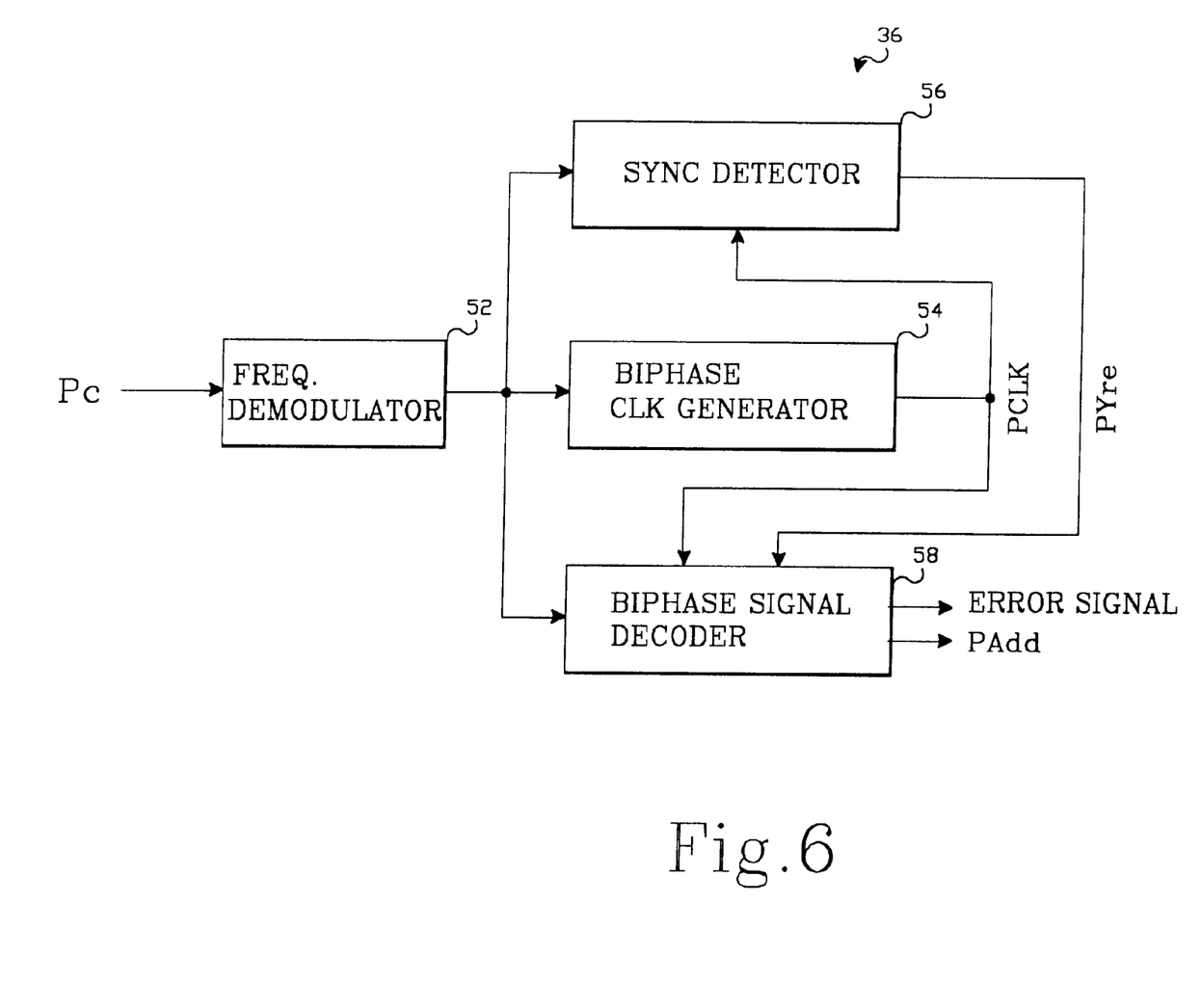
FIG. 6 is a detailed block diagram of a support information decoder shown in FIG. 4.
Figure 7A:
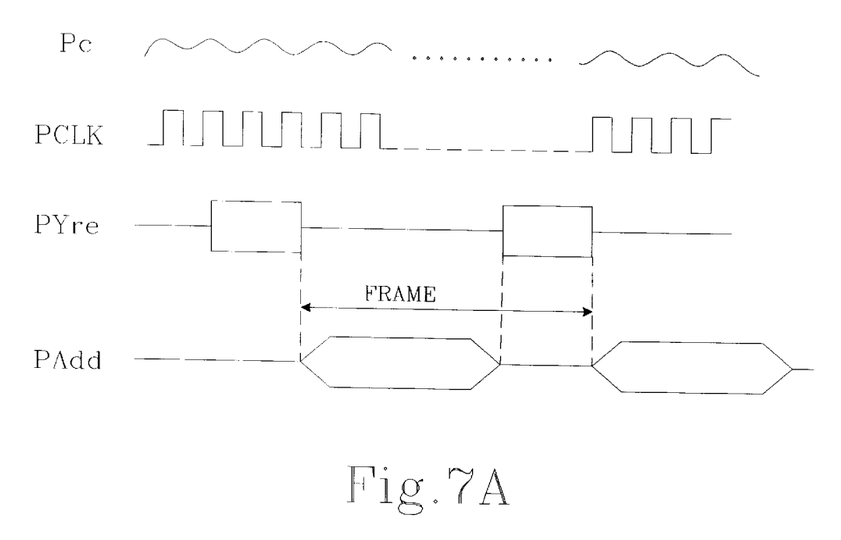
FIG. 7A is a waveform diagram showing the operation of each parts of the support information decoder shown in FIG. 6.

Accordingly, the support information decoder 36 reconstructs the support information preformatted or previously recorded on the disc from the carrier signal Pc output from the carrier signal detector 34. The support information decoder 36 consists of a dual phase clock generator 54, a synchronization detector 56 and a dual phase signal decoder 58 connected to a frequency demodulator 52 in parallel, respectively, as shown in FIG. 6. This frequency demodulator 52 make a frequency demodulation of the carrier signal Pc, as shown FIG. 7A, output from the adder/amplifier 50 in FIG. 5 to reconstruct a dual phase modulated signal. Further, the biphase clock generator 54 reconstructs a dual phase clock PCLK, as shown in FIG. 7A, based on the dual phase modulated signal output from the frequency demodulator 52 and then applies the reconstructed dual phase clock signal PCLK to both the synchronization detectors 56 and the dual phase signal decoder 58. Also, the synchronization detector 56 separates a synchronous signal PYre as shown in FIG. 7A from the dual phase modulated signal by utilizing the dual phase clock signal PCLK and then applies the synchronous signal PYre to the dual phase signal decoder 58. In turn, the dual phase signal decoder 58 detects an identification code portion from the dual phase modulated signal by means of the synchronous signal PYre, and reconstructs an address information PAdd contained in the identification code portion. Further, if error correction codes are contained in the support information, then the dual phase signal decoder 58 corrects an error generated at the address PAdd reconstructed by the reconstructed error correction code and simultaneously generates an error signal indicating the error correction state. The address signal PAdd reconstructed in this way is recorded on the groove track 12 of the optical disc 24 along with user data.

Figure 7B:
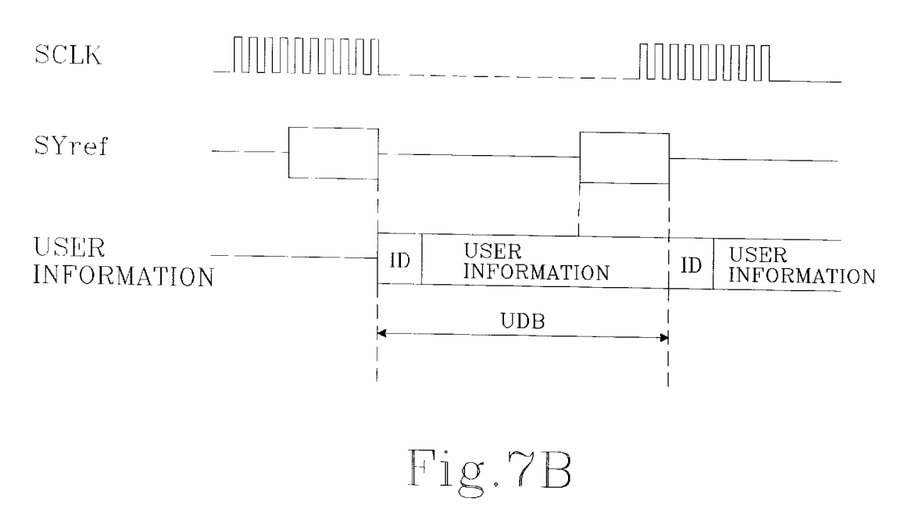
FIG. 7B is a waveform diagram showing the operation of a reference signal generator and a record information processor as shown in FIG. 4.

Furthermore, the conventional optical disc recording apparatus includes a reference signal generator 38 for generating a reference synchronous signal SYref and a reference clock signal SCLK, as shown in FIG. 4, and a light controller 42 connected between a record information processor 40 and the laser diode LD in the optical pickup 28. The record information processor 40 adds the address information PAdd from the support information decoder 36 in conformity to the reference synchronous signal SYref from the reference signal generator 38 to thereby form the identification code portion ID of the user data, and at the same time performs the blocking of the record data in accordance with the predetermined unit by means of the support information. Specifically, the user information unit constitutes a single defined unit UDB as shown in FIG. 7B, which is referred to as "user information block" hereinafter, along with the above-mentioned identification code portion.

In order that the recording of the user information as described above is performed, a period of the reference synchronous signal SYref must become identical to that of the support information synchronous signal PYre. The "user information block" UDB which is a unit of the user information has the same physical length as "frame" which is a unit of the support information.

The user information configured in this way is supplied with the laser diode LD via the light controller 42 in conformity to the reference clock signal SCLK generated at the reference signal generator 38 to be recorded on the groove track 12 of the optical disc 24.

As described above, the user information is subject to be recorded in a unit defined by the support information preformatted on the optical disc, that is, the frame unit. In other words, the length of the user information block has to be equal to the physical length of the frame.

However, in accordance with a characteristic of the user information, sometimes it is necessary to make the physical length of the user information different from the physical length defined by the frame. For example, in the case where a quantity of the information is important, it is necessary to relatively shorten the physical length of the frame corresponding to the information unit; while in the case where a quality of the information is important, it is necessary to relatively lengthen the physical length of the frame corresponding to the information unit. Therefore the conventional user information recording method cannot accommodate these needs.

SUMMARY OF THE INVENTION

Accordingly, it is an object of the present invention to provide an information recording method and apparatus wherein the user information can be recorded on a preformatted recording medium by varying the physical length of a predetermined information unit.

It is another object of the present invention to provide an information recording method and apparatus wherein an address of the user information can be made effectively at the time of recording the user information on a preformatted recording medium by varying the physical length of a predetermined information unit.

In order to accomplish the above and other objects, an information recording method according to one aspect of the present invention includes the steps of detecting a predetermined clock signal from a recording medium on which a synchronous signal and first address information have been preformatted, in such a manner that the synchronous signal and the first address information are modulated on a basis of the predetermined clock signal, wherein the synchronous signal divides a track into first unit regions and the first address information indicates the first unit regions; and counting the detected clock signal based on a predetermined value to divide the track into regions of a second unit, and then recording user information on the recording medium in response to said second unit.

Further, an information recording apparatus according to other aspect of the present invention comprises means for detecting a predetermined clock signal from a recording medium on which a synchronous signal and first address information have been preformatted, in such a manner that the synchronous signal and the first address information are modulated on a basis of the predetermined clock signal, wherein the synchronous signal divides a track into first unit regions and the first address information indicates the first unit regions; and means for counting the detected clock signal based on a predetermined value to divide the track into regions of a second unit, and then recording user information on the recording medium by assigning the user information in response to the second unit.

Furthermore, an information recording apparatus according to another aspect of the invention comprises an optical pickup for irradiating a light beam onto a track of a recording medium to record user information on the track, and for picking up the user information recorded on the track and the support information; signal detection means for detecting the modulated support information from the information picked up by the optical pickup; decoder means for reconstructing a clock signal from the modulated support information inputted from the signal detection means; region reorganization means for dividing the track into regions of a second unit by use of the clock signal; record information processor means for making a blocking of the user information in correspondence with the second unit region divided by the region reorganization means; and light control means for controlling the optical pickup in accordance with the blocked user information from the record information processor means.

BRIEF DESCRIPTION OF THE DRAWINGS

The above and other objects and features of the present invention will become more apparent from the following description taken in connection with the accompanying drawings, in which.

DETAILED DESCRIPTION OF THE PREFERRED EMBODIMENTS

Figure 8:
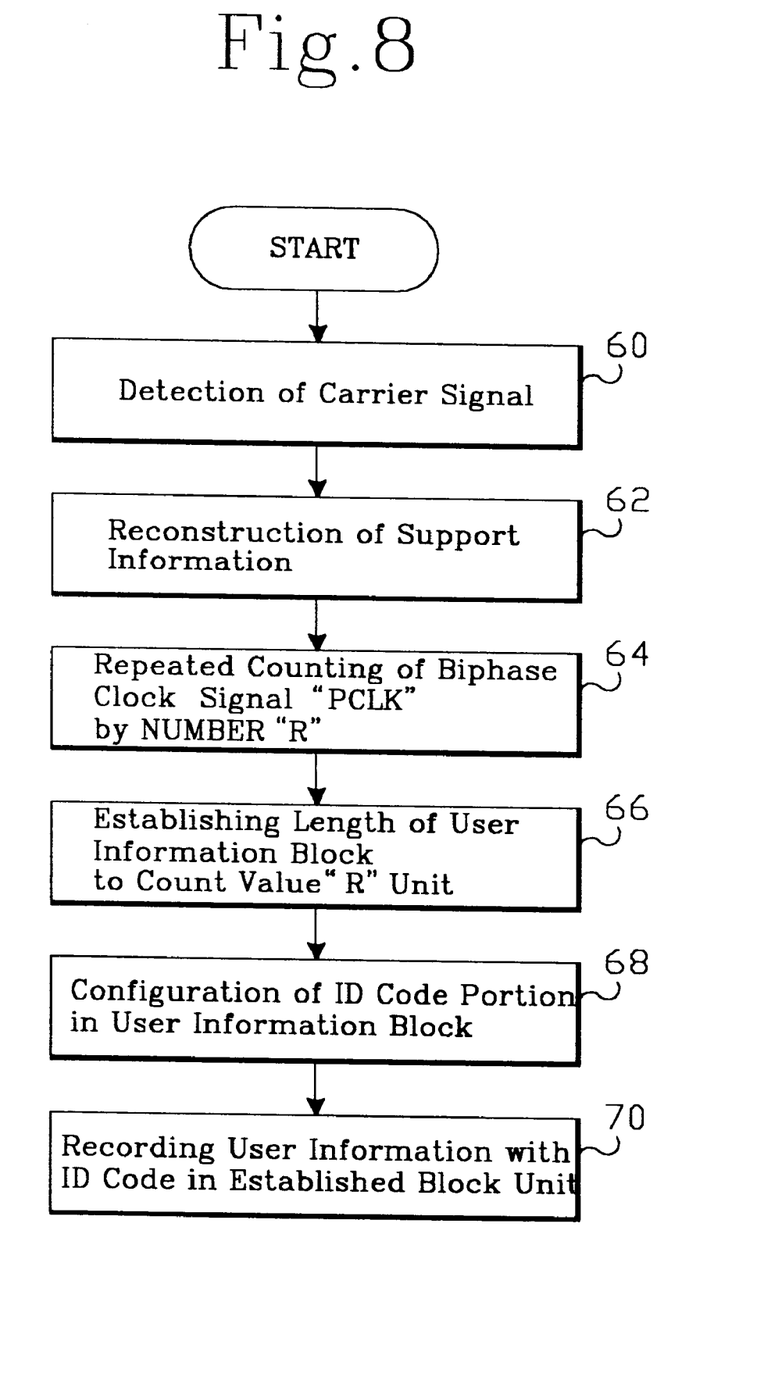
FIG. 8 is a flow chart for explaining an information recording method according to an embodiment of the present invention.

FIG. 8 shows an embodiment of an information recording method according to the present invention. This recording method will be described below in detail with reference to FIG. 8.

Herein, it is assumed that the support information has been preformatted on the recording medium, e.g., a disc, as described earlier.

First, in the step 60, a carrier signal is detected from the recording medium, specifically the groove tracks 12 in FIG. 1. The detection method is the same as described earlier. Then, in the step 62, the support information is reconstructed or demodulated from the detected carrier signal. This demodulated support information contains a synchronous signal and address information PAdd in a predetermined unit, that is, in each frame, and in said demodulation step the operation of an error correction of the address information is performed. Further, the support information contains a clock signal (i.e., the biphase clock signal PCLK) utilized at the time of modulating the support information.

Figure 12:
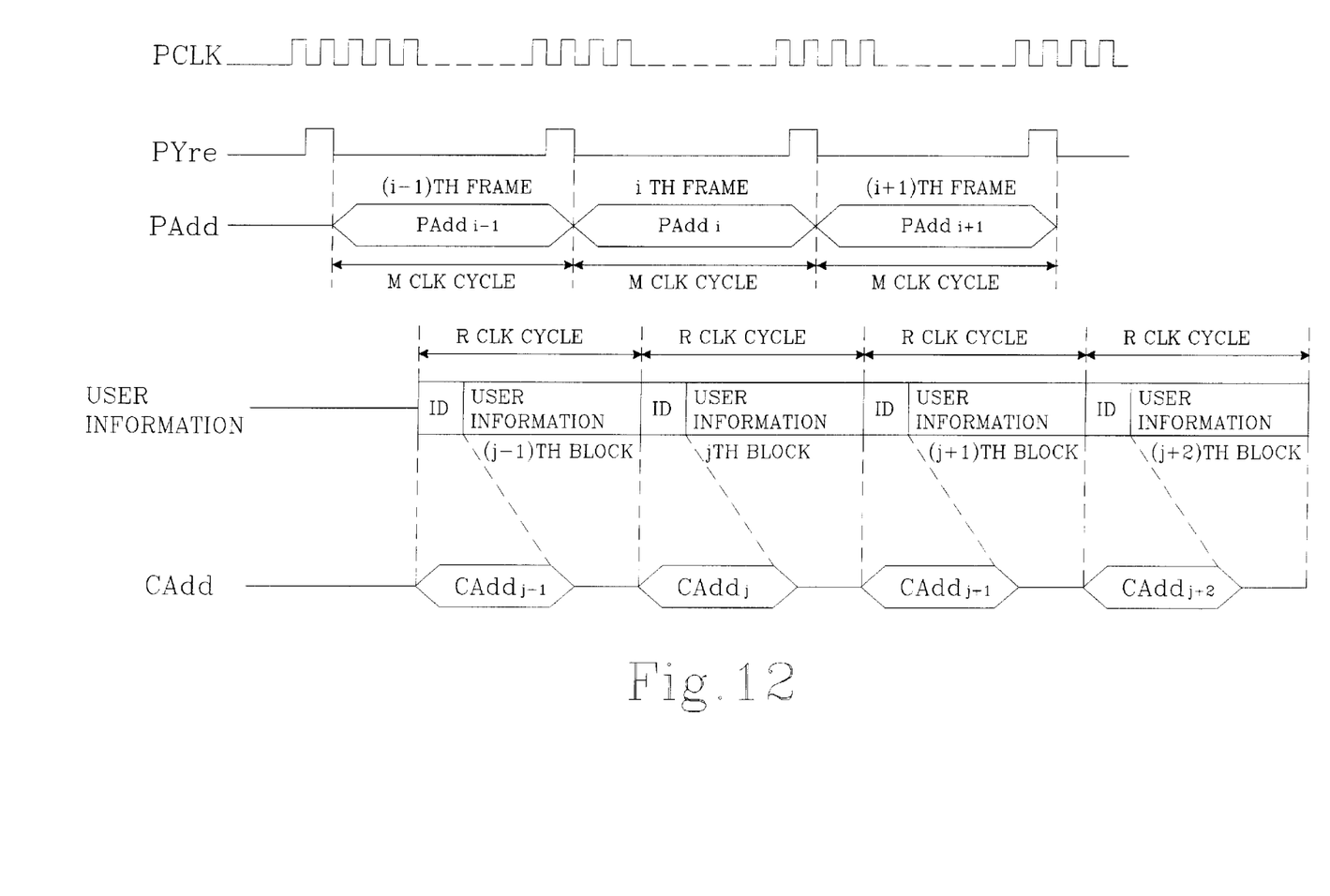
FIG. 12 is a view for explaining a state of the user data recorded onto the tracks of an optical disc by the optical disc recording apparatus shown in FIG. 9.

In turn, in the step 64, the clock signal is repeatedly counted by a predetermined number (R) of unit. Then, in the step 66, a user information unit is produced in accordance with this count value. In other words, a length of each user information block is defined by the clock signal number "R", and a synchronous signal portion for dentifying the blocks is made. This count value R is established at less or more value than a clock number M corresponding to one frame of the support information. FIG. 12 represents the case where the count value R is less than the clock number M in one frame. Subsequently, in the step 68, the identification code portion ID of the user information blocks is constituted. This identification code includes an address CAdd assigned in the way as will be described below. Finally, in the step 70, the user information is recorded on the disc, by corresponding it to the established block unit, together with the identification code ID.

In other words, as shown in FIG. 12, the user information is recorded in the block unit having a length different from the predetermined length of the frame unit used in recording the support information. Accordingly, although the length of the block is different from the conventional case, the quantity of the user information recorded per one block dose not change as described above. In other words, this means that the physical length occupied per information unit varies.

In the step 68, with reference to address information CAdd in the identification code of the user information block, there may be considered a method of forming the address information CAdd independently without exploiting the frame address information PAdd; otherwise a method of making the address information CAdd by exploiting the frame address information PAdd may be considered. An example of the former method includes a method of increasing sequentially per each block unit beginning with the first address at the time of the start of recording. However, this method has a problem in that, in the case where the operation of recording begins with the middle position of disc, address information fails to have a continuity with regard to the entire disc area, and that it is impossible to indicate the absolute position of disc because one address corresponds to a plurality of positions. The latter method is able to eliminate the problem in the former method. Hereinafter, the latter method therefore will be described in detail with reference to FIG. 12.

Referring to FIG. 12, for example, in the case where the recording of the user information begins with the block number j, an address CAddj can be calculated by dividing the total number Ctotal of the clock signal PCLK extending from the first position of the track until a position where the block number j begins by the number of pulses in the clock signal per one block R. The total clock number Ctotal is obtained by firstly multiplying an address value PAddi of the current corresponding frame by the clock number per frame M and then by adding the resultant value to the clock number Ci extended from the position where the current frame begins until now. That is, a formula expression of this becomes Ctotal=PAddi×M+Ci.

Accordingly, a formula for calculating the address CAddj of the block number j can be expressed as follows:

$$CAddj=(PAddi \times M+Ci)/R \qquad (1)$$

Alternatively, without directly using the block address CAddi calculated in the above manner as the block address, the block address CAddi may be converted once more in accordance with other regulations to be used as the block address for the user information.

As a result, according to the user information recording method as described above, it is possible to record the user information in such a manner that the length of the user information enlarges or shortens the predetermined physical length per unit record information, that is, the length of track corresponding to the frame.

Figure 9:
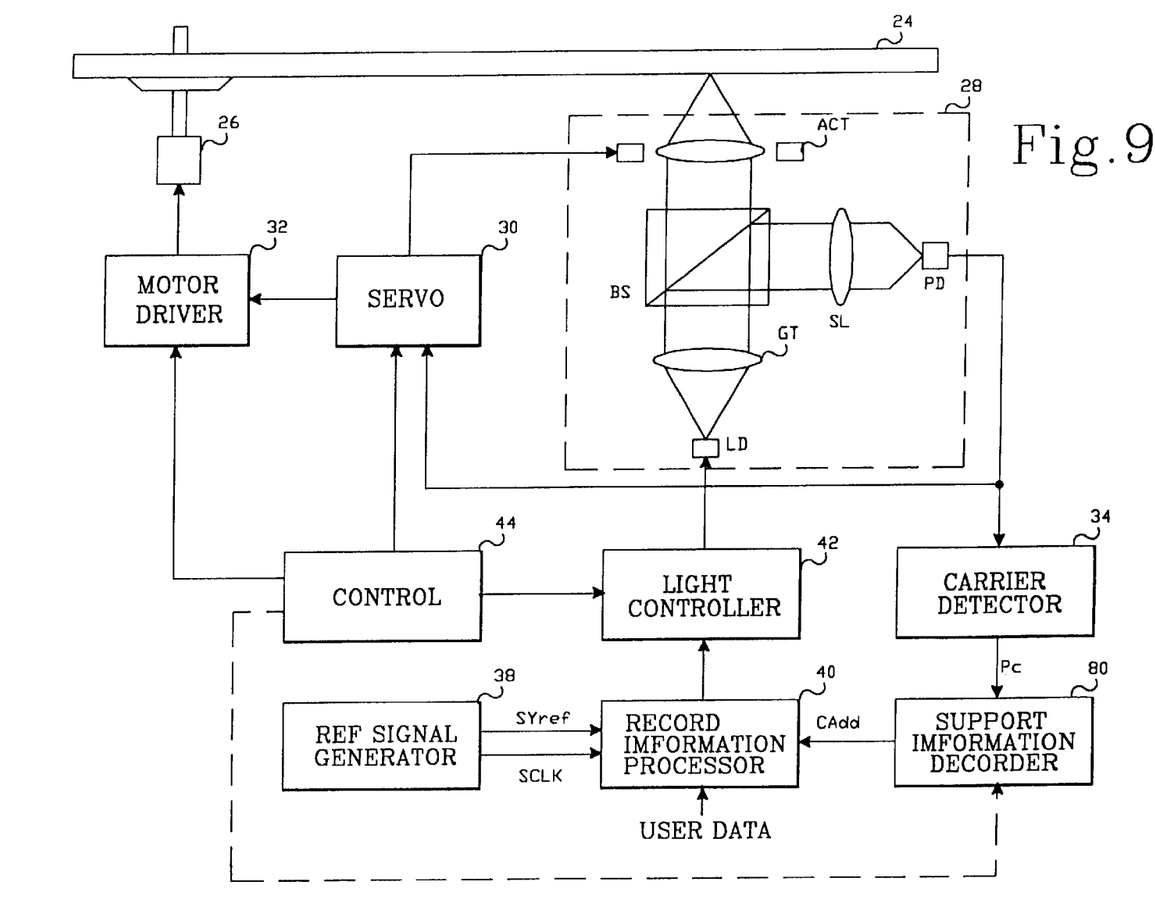
FIG. 9 is a block diagram showing the configuration of an optical disc recording apparatus according to an embodiment of the present invention.

FIG. 9 shows an optical disc recording apparatus according to a preferred embodiment of the present invention. Referring now to FIG. 9, the optical disc recording apparatus comprises a spindle motor 26 for rotating an optical disc 24, a servo portion 30 connected to an optical pickup 28, and a motor driver 32 connected to the spindle motor 26. The optical pickup 28 irradiates a single main light beam MB and two support light beams $SB_1$ and $SB_2$ onto the groove track 12 of the optical disc 24 as shown in FIG. 1, to thereby record information by the main light beam MB and to read out the preformatted support signal information by the support light beams $SB_1$ and $SB_2$. For this purpose, the optical pickup 28 includes a beam splitter BS disposed between a laser diode LD and a photo detector PD for dispersing a laser light beam, and an objective lens OL arranged between the optical disc 24 and the beam splitter BS. This objective lens OL converges a light beam progressing from the beam splitter BS toward the optical disc 24. The beam splitter BS allows a laser light beam generated at the laser diode LD to be irradiated onto the surface of the optical disc 24 via the objective lens OL and, at the same time, allows a light beam reflected by the optical disc 28 to be progressed via a sensor lens SL toward the photo detector PD. The sensor lens SL converges the light beam progressing from the beam splitter BS toward the photo detector PD to thereby control a focus by the so-called Astigmatism method. The light beam generated at the laser diode LD is separated into three light beams MB, $SB_1$ and $SB_2$ by a diffraction grid GT. Then, the light beams MB, $SB_1$ and $SB_2$ separated by the diffraction grid GT pass through the beam splitter BS, and thereafter converge by the objective lens OL such that they are disposed on the groove track 12 of the optical disc 24 as shown in FIG. 1. On the other hand, the light beams MB, $SB_1$ and $SB_2$ reflected by the groove tracks of the optical disc pass through the objective lens OL and the beam splitter BS in turn, and then converge onto the surface of the photo detector PD by the sensor lens SL. Further, the optical detector PD converts the support light beams $SB_1$ and $SB_2$ into electrical signals to generate the first and second high frequency signals RFt1 and RFt2. The servo portion 30 performs functions of, tracking servo, etc., by driving the actuator ACT in the optical pickup 28 by the first and second high frequency signals RFt1 and RFt2 from the photo detector PD. Also, the motor driver 32 controls a rotation speed of the spindle motor 26 in accordance with the signals from the servo portion 30.

Figure 10:
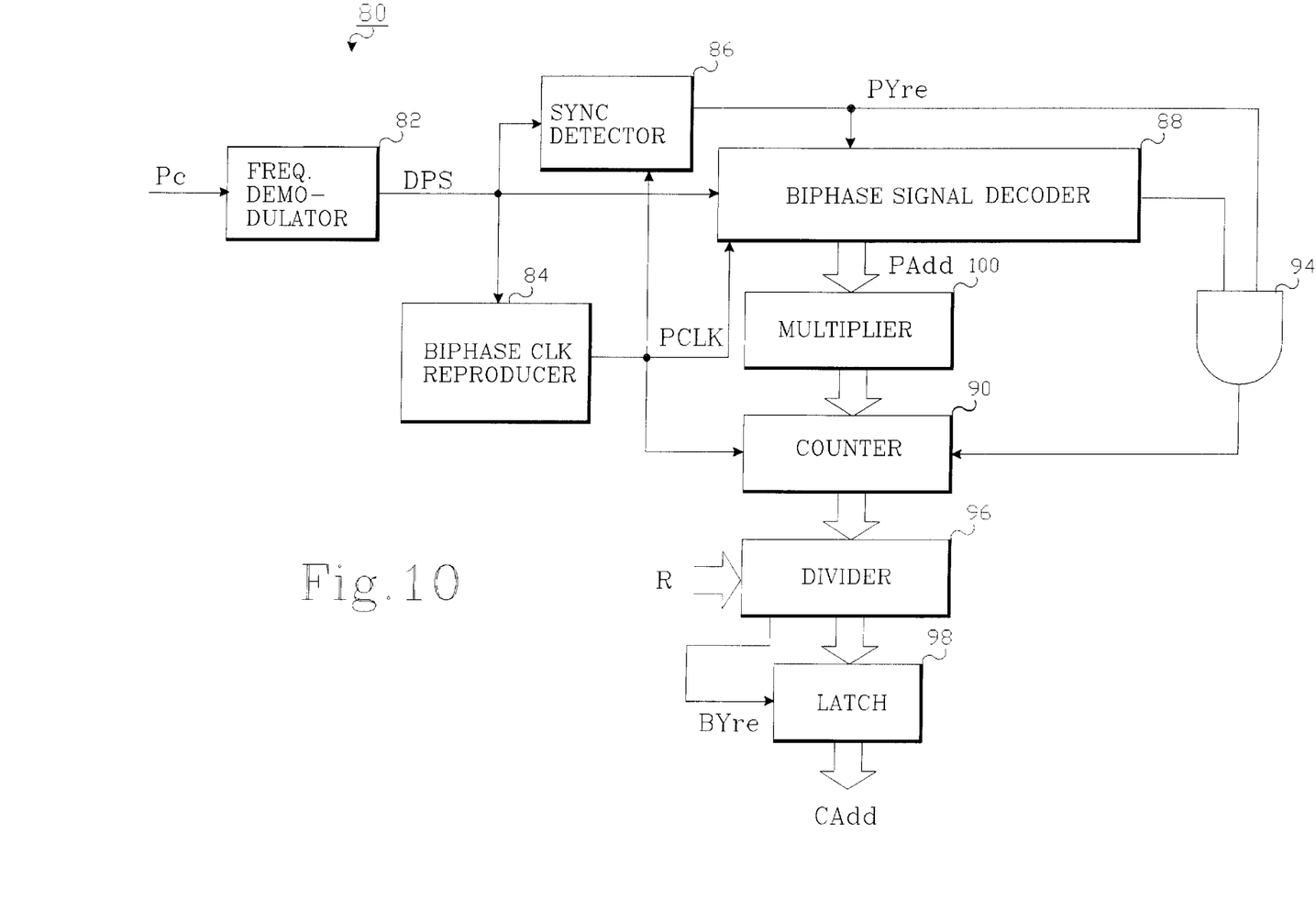
FIG. 10 is a detailed block diagram of the first embodiment of an adaptive support signal decoder shown in FIG. 8.
Figure 11:
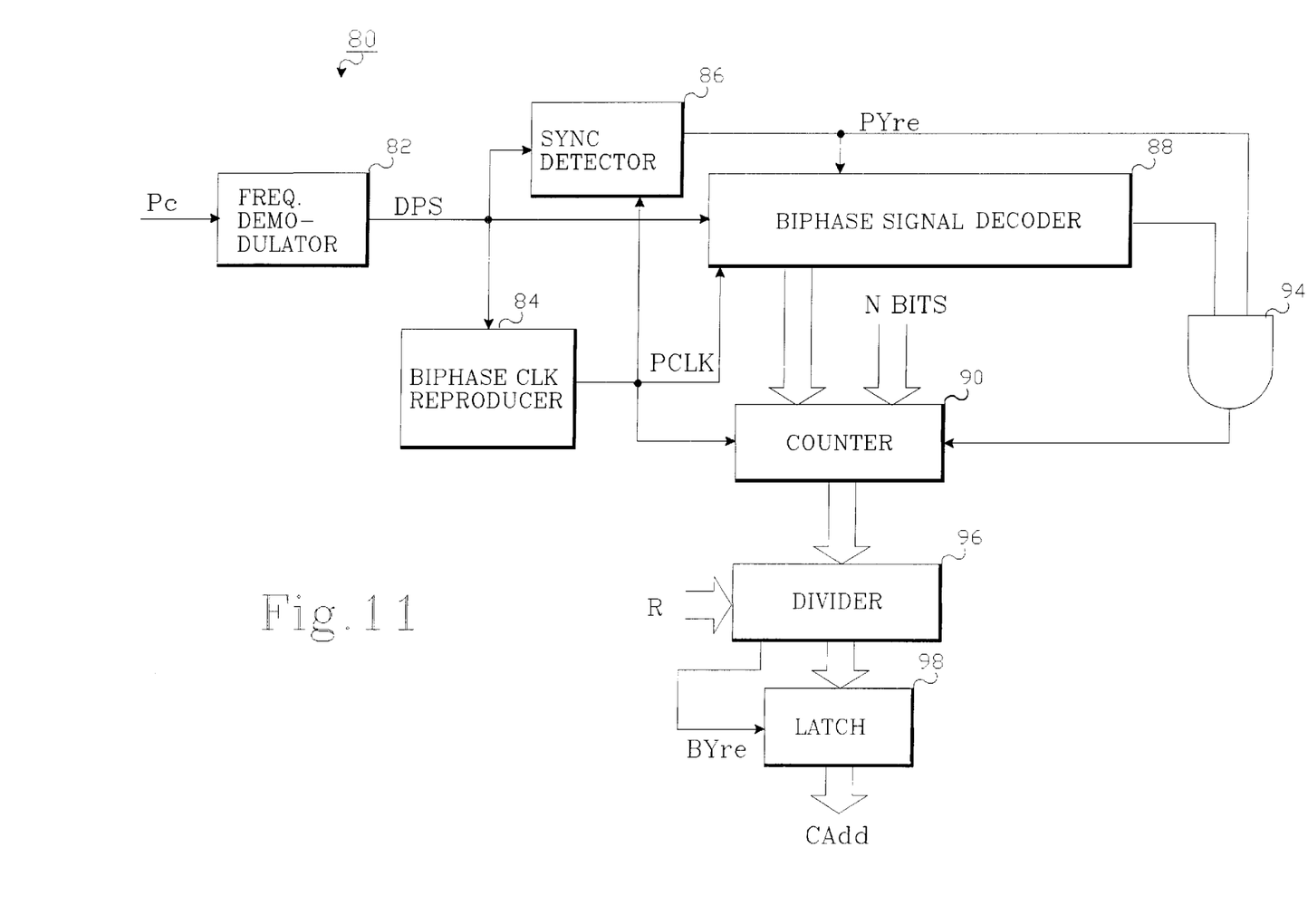
FIG. 11 is a detailed block diagram of the second embodiment of an adaptive support signal decoder shown in FIG. 8.

Furthermore, the optical disc recording apparatus includes a carrier signal detector 34 and an adaptive support information decoder 80 both connected to the photo detector PD in the optical pickup 28 in serial. The carrier signal detector 34 processes the first and second high frequency signals RFt1 and RFt2 to detect a support signal Pc preformatted on the groove track 12 of the optical disc 24. The carrier signal detector 34 can be configured as shown in, e.g., FIG. 5, or other configurations known in the art. The adaptive support information decoder 80 reconstructs the support information being recorded in advance or preformatted on the disc based on the carrier signal Pc outputted from the carrier signal detector 34. Further, the adaptive support information decoder 80 assigns the disc track in such a manner that it is different from the predetermined physical unit (length) or the length of the frame by the reconstructed support information, thereby forming newly converted address information CAdd. For this purpose, the adaptive support signal decoder 80 may take the configurations as shown in FIG. 10 and FIG. 11, which will be described later.

Furthermore, the optical disc recording apparatus of the present invention comprises a reference signal generator 38 for generating a reference synchronous signal SYref and a reference clock signal SCLK, and a light controller 42 connected between a record information processor 40 and the laser diode LD of the optical pickup 28. The record information processor 40 adds the converted address signal CAdd from the adaptive support information decoder 80 to the reference synchronous signal SYref from the reference signal generator 38 to thereby form the identification code portion ID, and also divides the user information into user information blocks UDB each having a newly specified physical length.

The user information constructed in the above way is supplied with the light controller 42 in conformity to the reference clock signal SCLK generated at the reference signal generator 38. Accordingly, the light controller 42 controls the laser diode LD in accordance with the output signal of the record information processor 40 to record the user information. At this time, since the reference clock signal SCLK must serve to constantly maintain the size of the information being recorded per one block even in the case where the length of the user information block varies as described above, it must serve to vary a period of the clock signal, too, in response to the variation of the block length.

Furthermore, the optical disc recording apparatus includes the servo portion 30, and a control portion 44 commonly connected the motor driver 32 and the light controller 42. The control portion 44 controls the operations of both the servo portion 30 and the motor driver 32 as well as the operation mode of the light controller 42. Also, this control portion 44 can designate the magnitude of the unit region in the groove track 12 of the optical disc 24 to be identified by the converted address signal CAdd from the adaptive support information decoder 80, that is, the number R of the biphase clock signal PCLK corresponding to the above-mentioned block unit. A dotted line in FIG. 9 represents such an operation of the control portion 44. Although an example of varying the clock number has been described at the above, it is possible to fix the clock number at a specific number.

FIG. 10 represents in detail the configuration of the first embodiment of the adaptive support decoder 80 as shown in FIG. 9. Referring to FIG. 10, the adaptive support information decoder 80 comprises a frequency demodulator 82 receiving the detected carrier signal PC from the carrier signal detector 32 shown in FIG. 9, a biphase clock reproducer 84 connected to the frequency demodulator 82, a synchronization detector 86 and a biphase signal decoder 88. The frequency demodulator 82 makes a frequency demodulation of the carrier signal Pc to reconstruct the biphase (or dual phase) signal DPS. The biphase clock reproducer 84 reproduces the biphase clock signal PCLK from the biphase signal DPS generated at the frequency demodulator 82 by use of a phase synchronous loop. The synchronization detector 86 detects a synchronous signal PYre from the biphase signal DPS by use of the biphase clock signal PCLK from the biphase clock generator 84. This synchronous signal PYre is applied to both the biphase signal decoder 88 and an AND gate 94.

Further, the biphase signal decoder 88 detects an identification code and an error correction code from the biphase signal using the synchronous signal PYre in order to reconstruct the identification code and, at the same time, performs an error correction thereof. This allows a frame address PAdd existing in the reconstructed identification code to be obtained, and also allows information for judging an error in the identification code to be obtained. The error in the identification code can be judged by outputting a logical signal of "0" indicating an error and a logical signal of "1" indicating no error.

Moreover, the adaptive support information decoder 80 includes a multiplier 100 and a counter 90 in order to count the total number of the biphase clock signal PCLK extending from the first position of the track to the current position thereof. The multiplier 100 receives a value of the frame address PAdd corresponding to the current position from the biphase signal decoder 88, multiplies the biphase clock number per one frame M by this value, and then outputs the resultant value to the counter 90. At this time, the resultant value, that is, PAdd×M becomes the pulse number in the biphase clock signal extending from the first position of the track to the start position of the most current frame.

Further, the counter 90 loads the output value PAdd×M of the multiplier 100 by a specified control signal and simultaneously counts the number of pulses in the biphase clock signal PCLK beginning with the loaded value, and then outputs the counted value. The specified control signal is a signal outputted from the AND gate 94 as shown in FIG. 10, which becomes a logical signal of "1" only in the case where an error does not exist in the identification code and also in the synchronous signal of the support information, that is, when the frame is detected. In other words, only in the case where the synchronous signal is normally detected, it allows loading of the output value of the multiplier 100 and counting in the counter 90 to be started. Specifically, assuming that the number of the biphase clock signal PCLK extending from the time loaded from the multiplier 100 to the counter 90, that is, the time when a synchronization of the current frame is detected to the current time is "Ci", the output value of the counter 90 becomes the total biphase clock number Ctotal extending from the first position of the track to the current one, i.e., PAdd×M+Ci.

On the other hand, in the case where an error occurs in the current identification code, the biphase signal decoder 88 allows the counting operation of the counter 90 to be maintained continuously by inputting an output of "0" logic to the AND gate 94. That is to say, the count value of the counter 90 is obtained by the following formula.

$$Ctotal = PAdd_{i-1} \times M + C_{i-1} \quad (2)$$

Herein, $PAdd_{i-1}$ represents the previous frame address and $C_{i-1}$ represents the number of pulses in the biphase clock signal PCLK extending from the time when the previous frame is detected to the current time. Accordingly, even in the case where an error occurs in the identification code, the total clock number Ctotal represents a clock signal extending from the first position of the track to the current track position.

In the case where the synchronous signal PYre of the current frame is not detected, an output of the synchronization detector 86 becomes a logic "0" and thus the output of the AND gate 94 becomes a logic "0" to thereby maintain the operation of the counter 90 continuously, so that the total number of the biphase clock signal PCLK can be obtained like the above.

Moreover, the support information decoder 80 further comprises a divider 96 receiving the output value of the counter 90, and a latch 98 connected the divider 96. This divider 96 receives the output value of the counter 90, that is, PAdd×M+Ci, to perform an operation of dividing it by the predetermined value "R", and then outputs the quotient CAdd of the dividing operation to the latch 98. Also, whenever the remainder of the operation becomes 0, the divider 96 generates a predetermined reference signal BYre and outputs it to the latch 98. In turn, the latch 98 receives the output of the divider 96, and outputs the quotient CAdd to the record information processor 40 shown in FIG. 9 whenever the reference signal BYre is generated. Accordingly, the region identified by the reference signal BYre becomes the record unit or block of user information being specified newly while the quotient CAdd becomes the converted address CAdd corresponding to each block. In other words, the converted address CAdd is obtained like in the foregoing formula (1). This converted address CAdd becomes an address of the user information block in the record information processor 40. Also, it can be said that the multiplier 100, counter 90 and the divider 98 perform a region reorganization function of reorganizing the disc track into the record unit of user information having a length greater than or less than the length of the frame region identified by the support information signal.

On the other hand, the reference signal generator 38 in the recording apparatus as shown in FIG. 9 generates both the reference clock signal SCLK and the reference synchronous signal SYref corresponding to the newly specified block unit. Specifically, the reference signal generator 38 generates the reference synchronous signal SYref with the same period as a generation period of the reference signal BYre outputted from the divider 96 in FIG. 10 while it generates the reference clock signal SCLK a period of which is set in such a manner that information amount corresponding to one frame of the support information can be accommodated within the newly specified block. The reference signal generator 38 outputs a fixed reference clock signal and a fixed reference synchronous signal conforming in length to the corresponding block length in the case where the recording apparatus has fixed the block length in advance, that is, in the case where the predetermined value "R" has been fixed, as described earlier; while it outputs a variable reference clock signal and a variable synchronous signal in the case where the recording apparatus is able to vary the block length, that is, in the case where the value "R" is varied. Otherwise, the reference signal BYref generated at the adaptive support information decoder 80, as it was, may be employed as the reference synchronous signal SYref.

FIG. 11 represents a configuration of the second embodiment of the adaptive support information decoder 80 shown in FIG. 9. The configuration and operation of the decoder 80 according to this second embodiment is similar to those of the first embodiment in FIG. 10, except for the multiplier 100 and the counter 90. This second embodiment is applicable to the case where the number "M" of biphase clock signal PCLK per one frame of the support information can be expressed as $2^N$. In this case, the multiplier 100 is omitted and "n" numbers of low order bits of the counter 90 is set to "0". If the frame address PAdd from the biphase signal decoder 88 is loaded in the remaining high order bits of the counter 90, then it is possible to obtain the effect of loading the value of "PAdd×M", as in the first embodiment. In other words, the second embodiment has an advantage in that its operation speed is faster than that of the first embodiment because it does not need the multiplier 100 of FIG. 10.

FIG. 12 represents the case where the user information has been recorded on the preformatted disc in such a manner that the information unit length becomes shorter than the physical length of the predetermined information unit, i.e., the frame of the support information. For example, "R" becomes less than "m".

As described above, according to the information recording method and apparatus according to the embodiments of the present invention, it is possible to record the user information on the preformatted recording medium in the information unit different from, that is, longer or shorter, than the physical length of the predetermined information unit. In other words, the present invention can provide an apparatus which records the user information in the information unit with a length different from the physical length of the information unit established in advance in accordance with the characteristic of the user information to be recorded, with reference to the identically preformatted recording medium.

Also, according to the present invention, it is possible not only to record the user information by fixing the physical length being variable with reference to a single recording apparatus, but also to selectively record the user information by varying the physical length in a plurality of number.

Further, according to the present invention, it is understood that the address of the user information unit (or block) can be made properly.

Moreover, according to the present invention, it is understood that the user information unit and the address thereof can be made suitably even in the case where an error occurs in the identification code of the preformatted support information, that is, the frame support information, or where the frame synchronous signal does not occur.

Although the present invention has been described by the preferred embodiments illustrated in drawings hereinbefore, it is apparent from the above description to those ordinarily skilled in the art that various changes and modifications of the invention is possible without departing from the spirit thereof. Accordingly, the scope of the invention should be determined not by the embodiments illustrated and described, but by the appended claims and their equivalents.

What is claimed is:

1. An information recording method which comprises the steps of:

reproducing support information preformatted on a recording medium;

detecting a predetermined clock signal based on the support information, the support information including a synchronous signal and first address information, said synchronous signal dividing a track on the recording medium into a plurality of predetermined first unit regions, said first address information indicating said first unit regions;

counting pulses of said detected predetermined clock signal to generate new address information for dividing the track into second unit regions; and recording user information on the recording medium according to said second unit regions.

2. An information recording method as set forth in claim 1, wherein a quantity of the user information corresponding to said second unit is equal to that of the user information corresponding to said first unit.

3. An information recording method as set forth in claim 1, wherein each of said second unit regions is smaller in length than each of said first unit regions.

4. An information recording method as set forth in claim 1, wherein each of said second unit regions is larger in length than each of said first unit regions.

5. An information recording method as set forth in claim 1 wherein said detecting step includes a step of reconstructing said first address information on a basis of said detected clock pulses; and wherein said counting step includes a step of generating the new address information on a basis of said first address information in accordance with a following formula:

$$CAdd_j = (PAdd_i \times M + C_i)/R$$

in which $CAdd_j$ represents a current second address, $PAdd_i$ a current first address, $C_i$ the number of clock pulses in the predetermined clock signal extending from a reference position of said first address to a current position on the recording medium, M the number of clock pulses contained in one of said first unit regions, and R the number of clock pulses contained in one of said second unit regions.

6. An information recording method as set forth in claim 5 wherein, in the case where an error exists in said first address information, said counting step generates said second address on a basis of a previous first address ($PAdd_{i-1}$) in accordance with a following formula:

$$CAdd_j = (PAdd_{i-1} \times M + C_{i-1})/R$$

in which $CAdd_j$ represents a current second address, $PAddi_{-1}$ a previous first address, $C_{i-1}$ the number of clock pulses in the predetermined clock signal extending from a reference position of said previous first address to a current position on the recording medium, M the number of clock pulses contained in said one first unit region, and R the number of clock pulses contained in said one second unit region.

7. An information recording apparatus, comprising:

detection means for reproducing support information preformatted on a recording medium, detecting a predetermined clock signal based on the support information, the support information including a synchronous signal and first address information, said synchronous signal dividing a track on the recording medium into first unit regions, said first address information indicating said first unit regions; and recording means for counting pulses of said detected clock signal to generate new address information for dividing the track into second unit regions, and then recording user information on the recording medium according to said second unit regions.

8. An information recording apparatus as set forth in claim 7, wherein a quantity of the user information corresponding to said second unit is equal to that of the user information corresponding to said first unit.

9. An information recording apparatus as set forth in claim 7 wherein each of said second unit regions is smaller in length than each of said first unit regions.

10. An information recording apparatus as set forth in claim 7, wherein each of said second unit regions is larger in length than each of said first unit regions.

11. An information recording apparatus as set forth in claim 7, wherein said detecting means includes means for reconstructing said first address information on a basis of said detected clock pulses; and wherein said recording means includes means for generating the new address information on a basis of said first address information in accordance with a following formula:

$$CAdd_j = (PAdd_i \times M + C_i)/R$$

in which $CAdd_j$ represents a current second address, $PAdd_i$ a current first address, $C_i$ the number of clock pulses in the predetermined clock signal extending from a reference position of said first address to a current position on the recording medium, M the number of clock pulses contained in one of said first unit region, and R the number of clock pulses contained in one of said second unit regions.

12. An information recording apparatus as set forth in claim 7, which further comprises:

counter means for counting a total number of clock pulses in the predetermined clock signal extending from a first position of the track to a current recording position; and second address generating means including operation means for dividing said total clock number by a predetermined clock number corresponding to said second unit region to generate a resultant quotient of said dividing operation as an address of said second unit region whenever a resultant remainder of said dividing operation becomes "0".

13. An information recording apparatus as set forth in claim 12, wherein said counter means includes;

a multiplier for multiplying the clock number corresponding clock pulses contained in said first unit region by said reconstructed first address information; and a counter for receiving an output of said multiplier and counting said clock signal from said multiplied value.

14. An information recording apparatus as set forth in claim 12, wherein said counter means includes a counter for receiving a value of "0" for N numbers of low order bits while with said first address information for remaining high order bits, in the case where the number of clock pulses contained in said first unit region becomes $2^N$, in which N is an integer, and for counting said clock from said loaded value.

15. An optical recording apparatus for recording information onto a recording medium in which a track is divided into regions of a predetermined first unit and on which support information has been preformatted in every said first unit region, said support information being modulated with a synchronous signal and first address information in response to a predetermined clock signal, said optical recording apparatus comprising:

an optical pickup for irradiating a light beam onto said track of the recording medium to record user information on said track, and for reproducing said support information recorded on the recording medium;

signal detection means for detecting the predetermined clock signal from said support information reproduced by said optical pickup;

decoder means for reconstructing said predetermined clock signal from said support information detected by said signal detection means;

region reorganization means for dividing said track into regions of a second unit by using said reconstructed clock signal;

record information processor means for dividing the user information in correspondence with said second unit region; and light control means for controlling said optical pickup to record the divided user information on the recording medium.

16. An information recording apparatus as set froth in claim 15, wherein said region reorganization means includes;

a counter for counting the number of clock pulses in the reconstructed clock signal; and a divider for dividing a count value output from said counter by a predetermined value, and for sectioning said track into said second unit regions, said second unit regions being different from said first unit regions in length.

17. An information recording apparatus as set forth in claim 15, wherein said decoder means additionally decodes said first address information of said support information, and wherein said decoder means further comprises operation means for calculating region information extending from a start position of said track to a start position of said first unit region on which a light beam is disposed, by using said first address information, and for supplying said region information with said counter.

18. An information recording apparatus as set forth in claim 17, wherein said decoder means additionally decodes said synchronous signal of said support information, and said counter inputs said region information from said operation means in response to said synchronous signal from said decoder means.

19. An information recording apparatus as set forth in claim 18, wherein said decoder means additionally generates an error detection signal indicating whether or not an error is present in said first address information, and said counter selectively inputs said region information from said operation means in accordance with logical values of said synchronous signal and said first address information.

20. An information recording apparatus as set forth in claim 19, wherein said operation means includes a multiplier for multiplying said first address information to said number of clock pulses contained in said first unit region to calculate said region information.

* * * * *